(12) United States Patent
Yanagi et al.

(10) Patent No.: US 7,212,185 B2
(45) Date of Patent: May 1, 2007

(54) DISPLAY DEVICE AND DRIVING METHOD THEREOF

(75) Inventors: Toshihiro Yanagi, Nara (JP); Taketoshi Nakano, Kawasaki (JP); Asahi Yamato, Yokohama (JP)

(73) Assignee: Sharp Kabushiki Kaisha, Osaka (JP)

( * ) Notice: Subject to any disclaimer, the term of this patent is extended or adjusted under 35 U.S.C. 154(b) by 285 days.

(21) Appl. No.: 10/621,364

(22) Filed: Jul. 18, 2003

(65) Prior Publication Data

US 2004/0036669 A1 Feb. 26, 2004

(30) Foreign Application Priority Data

Aug. 22, 2002 (JP) ............................. 2002-242119

(51) Int. Cl.
*G09G 3/36* (2006.01)
*G09G 5/00* (2006.01)

(52) U.S. Cl. ...................................................... 345/99

(58) Field of Classification Search ................. 345/87, 345/97–100, 204, 211–213
See application file for complete search history.

(56) References Cited

U.S. PATENT DOCUMENTS

| | | | |
|---|---|---|---|
| 5,537,650 A | | 7/1996 | West et al. |
| 5,615,376 A | * | 3/1997 | Ranganathan ................ 713/322 |
| 6,088,806 A | * | 7/2000 | Chee ........................... 713/322 |
| 6,515,716 B1 | | 2/2003 | Suzuki et al. |
| 2002/0140661 A1 | * | 10/2002 | Miyajima et al. .............. 345/96 |
| 2002/0180673 A1 | * | 12/2002 | Tsuda et al. ................... 345/87 |

FOREIGN PATENT DOCUMENTS

| | | |
|---|---|---|
| CN | 1274233 A | 11/2000 |
| EP | 1 189 192 A2 | 3/2002 |

* cited by examiner

*Primary Examiner*—Amr A. Awad
*Assistant Examiner*—Stephen Sherman
(74) *Attorney, Agent, or Firm*—Harness, Dickey, & Pierce, PLC

(57) ABSTRACT

A display device includes an inaction control circuit and a DCK-PLL circuit. The inaction control circuit stops driving of driving circuits, such as a signal line driving circuit, a scanning line driving circuit, analog circuit and the like, which are provided for driving an active matrix panel. The inaction control circuit stops the control circuits in a non-refresh period where all scanning lines become non-scanning state and provided between refresh periods for scanning a screen of the active matrix panel. The inaction control circuit also stops driving of the DCK-PLL circuit in the non-refresh period, in addition to stopping driving of the driving circuits.

22 Claims, 16 Drawing Sheets

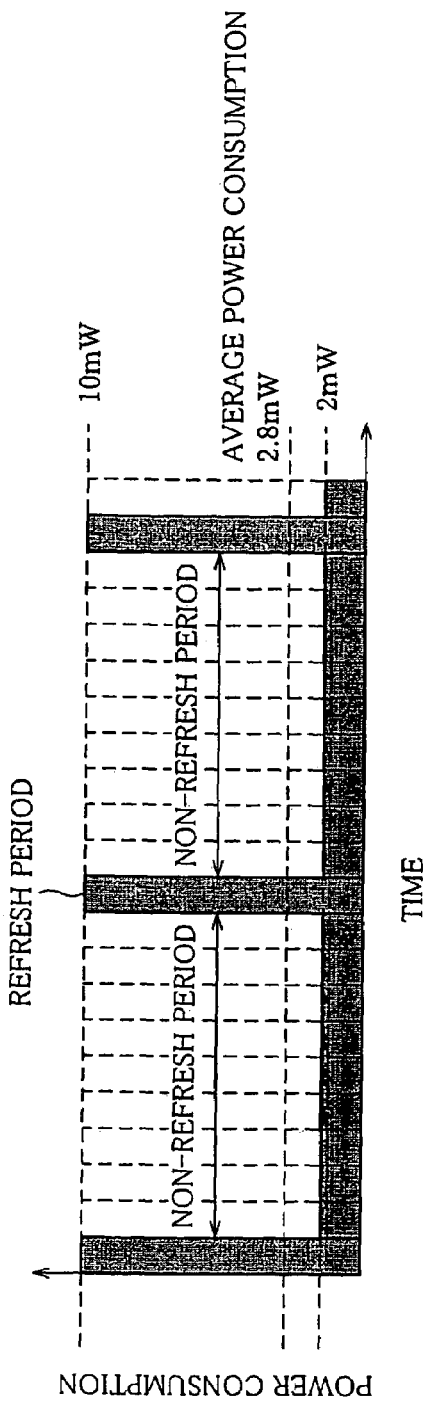
FIG. 3 (a) (PRIOR ART)
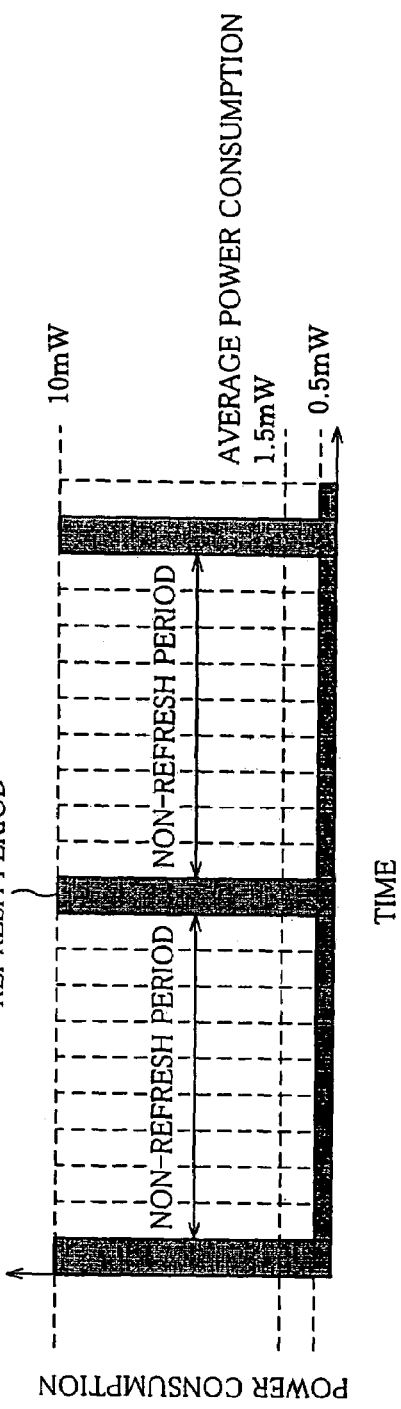
FIG. 3 (b)

FIG. 14 (a) (PRIOR ART)
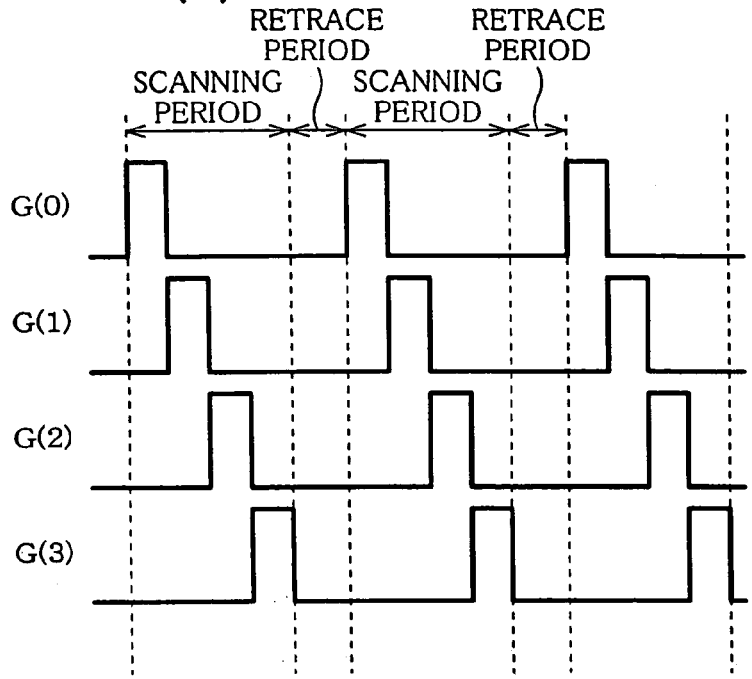
FIG. 14 (b) (PRIOR ART)
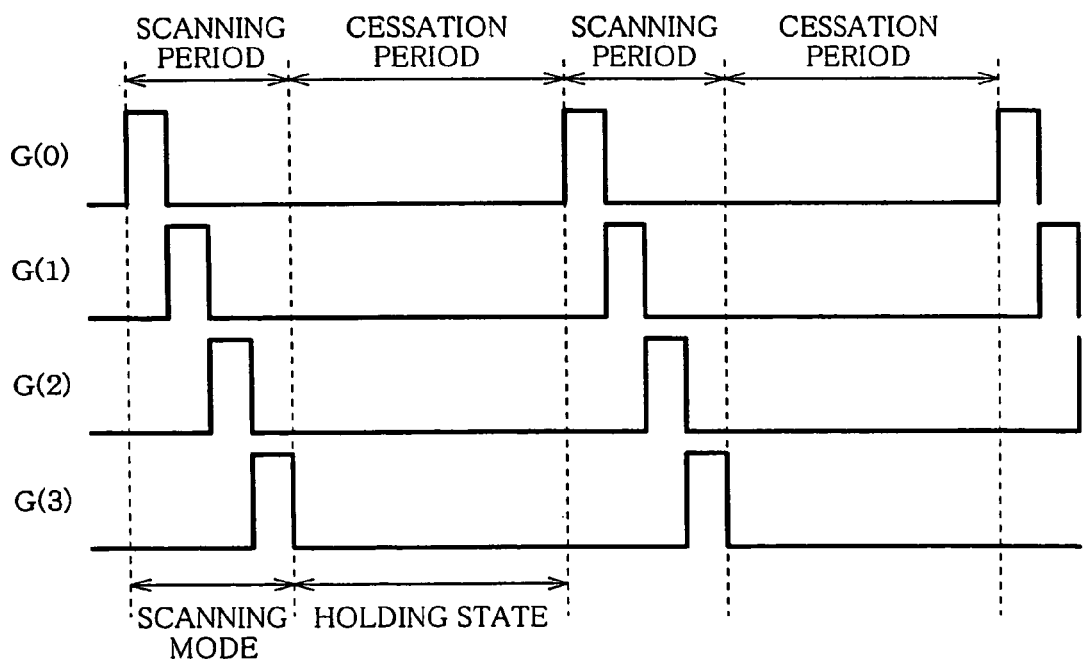

DISPLAY DEVICE AND DRIVING METHOD THEREOF

FIELD OF THE INVENTION

The present invention relates to a display device which selects each line of a screen of a display section in which pixels are aligned in a matrix manner by applying a scanning signal to a scanning signal line of the pixel of each line so as to scan the screen, and also supplies a data signal from a data signal line to the pixel of the selected line so as to carry out display, and also relates to the driving method of the display device.

BACKGROUND OF THE INVENTION

Generally, as shown in FIG. 10, an active matrix display device includes an active matrix panel 101 having pixels aligned in a matrix manner, a signal line driving circuit 102 for driving a data signal line (not shown) in the active matrix panel 101, a scanning line driving circuit 103 for driving a scanning line (not shown) in the active matrix panel 101, a frame memory 104 for storing a digital image signal transferred to the signal line driving circuit 102, and an analog circuit 105 for generating a signal (level voltage) which converts a digital image signal into an analog signal at the signal line driving circuit 102.

The display device further includes a dot clock oscillation circuit (DCK oscillation circuit) 106, an H counter 107, and a V counter 108.

The DCK oscillation circuit 106 oscillates a dot clock for transferring a digital image signal stored in the frame memory 104 to the signal line driving circuit 102 on a frame by frame basis. The dot clock oscillated from the DCK oscillation circuit 106 is supplied to the signal line driving circuit 102 so as to be used as a sampling clock of an image signal.

Further, the dot clock oscillated from the DCK oscillation circuit 106 is also supplied to the H counter 107. The H counter 107 generates a horizontal synchronization series signal based on the dot clock which has been supplied, and this horizontal synchronization series signal is supplied to the signal line driving circuit 102 and the scanning line driving circuit 103.

The horizontal synchronization series signal is used in the signal line driving circuit 102 as an output timing signal of the image signal for determining output timing to the active matrix panel 101, and is used in the scanning line driving circuit 103 as an output timing signal of the scanning signal for determining output timing to an active matrix panel 101.

Further, the horizontal synchronization series signal generated in the H counter 107 is supplied to the V counter 108. The V counter 108 generates a vertical synchronization series signal from the horizontal synchronization series signal, and supplies this signal to the scanning line driving circuit 103 so as to be used as a timing signal for controlling scanning start timing of the scanning line.

FIG. 11 shows respective waveforms of a dot clock (DCK) oscillated in the DCK oscillation circuit 106, a horizontal synchronization series signal (Hsync) generated in the H counter 107 and a vertical synchronization series signal (V sync) generated in the V counter 108 in a display device having the foregoing arrangement.

Note that, since the DCK is higher in speed than the other signals (Hsync, Vsync), the period of this signal is dense (painted black) in the waveform shown in FIG. 11.

In the display device having the foregoing arrangement, the scanning signal line in the active matrix panel 101 is driven at the timings shown in FIG. 14(a). More specifically, the display device carries out display by sequentially applying a ON voltage to the scanning signal lines G(0), G(1), G(2), G(3), . . . so as to turn on TFTs connected to the respective scanning lines. Here, "a scanning period" designates a period where a given scanning line is on. Further, a retrace period is provided between the respective scanning periods.

However, assuming that the active matrix panel 101 is a hold-type display element, which is, for example, a TFT liquid crystal panel, a period for holding a charge by the liquid crystal may be provided between the respective scanning periods. Since the charge is held by the liquid crystal in this period, no voltage application is necessary to the liquid crystal. Therefore, the driving circuits for driving the active matrix panel 101 are not required to be driven in this period. This period is referred to as an inaction period.

A display device as an assumable example to realize such a driving method is shown in FIG. 12. This display device including an inaction control circuit 109 for stopping driving circuits, i.e., a signal line driving circuit 102, a scanning line driving circuit 103, and an analog circuit 105.

The inaction control circuit 109 generates a scan signal (Scan signal) shown in FIG. 13 from a horizontal synchronization series signal generated in the V counter 108, and supplies the Scan signal to the signal line driving circuit 102, the scanning line driving circuit 103, and the analog circuit 105.

The Scan signal is a binary signal whose level becomes high in the scanning period and becomes low in the inaction period. Accordingly, if the device is arranged to carry out operations of the signal line driving circuit 102, the scanning line driving circuit 103 and the analog circuit 105 when the level of the supplied Scan signal is high, and to stop their operations when the level is low, power consumption in the inaction period can be reduced. Such a technology is disclosed in Japanese Unexamined Patent Publication No. 312253/2001 (published on Nov. 9, 2001 (Corresponding U.S. Pub. No. 2002/0180673A1)).

Here, with reference to FIGS. 15(a) and 15(b), the following will explain the respective power consumptions in case of performing the driving method for a display device shown in FIG. 14(a) and the driving method for a display device shown in FIG. 14(b).

FIG. 15(a) shows power consumption of the driving method for a display device shown in FIG. 14(a), and FIG. 15(b) shows power consumption of the driving method for a display device shown in FIG. 14(b).

In the driving method for a display device shown in FIG. 14(a), the all circuits included in the display device are always in operation, and therefore, as shown in FIG. 15(a), power consumption in one frame period is equal to the average power consumption of the display device. In this case, it is assumed that power consumption in one frame period is 10 mW.

On the other hand, in the driving method for a display device shown in FIG. 14(b), among the circuits included in the display device, the signal line driving circuit 102, the scanning line driving circuit 103 and the analog circuit 105 are controlled to stop their operations in a non-refresh period (the inaction period), and therefore the power consumption is high in a refresh period (the scanning period) and low in the non-refresh period, thus reducing average power consumption of the display device.

Incidentally, since the display device shown in FIG. 12 is arranged so that a signal (horizontal synchronization series signal, vertical synchronization series signal) for determining a frame for scanning and a frame for non-scanning is generated based on a dot clock from the DCK oscillation circuit 106, the DCK oscillation circuit 106 is driven even in the non-refresh period.

Besides, the DCK oscillation circuit 106 consumes great power due to the function for generating a high-speed clock such as a timing clock used in the refresh period for determining such as writing timing.

Therefore, even though reduction of the average power consumption is attempted by using the driving method for a display device shown in FIG. 14(*b*) which can reduce power consumption in the inaction period, the operation of the DCK oscillation circuit 106 which consumes more power than the other driving circuits (the signal line driving circuit 102, the scanning line driving circuit 103 and the analog circuit 105) in the non-refresh period prevents the power consumption in the non-refresh period from being greatly reduced.

For example, when the DCK oscillation circuit 106 operates at 500 kHz, the power consumption is found as 2 mW according to the graph shown in FIG. 16. That is, the average power consumption in the non-refresh period shown in FIG. 15(*b*) becomes close to 2 mW.

Here, assuming that the power consumption in the refresh period is 10 mW, and the power consumption ratio of the refresh period to the non-refresh period is 1:9, the average power consumption is found as follows.

(10 mW×1+2 mW×9)/10=2.8 mW.

If the ratio of non refresh period is increased, the average power consumption can be decreased; however, the average power consumption still only becomes closer to 2 mW, i.e., the power consumption in the non-scanning period, and the reduction cannot go further. More specifically, it is impossible to reduce the power consumption less than the power consumed in the circuits operating in the non-refresh period.

SUMMARY OF THE INVENTION

An object of the present invention is to provide a display device which stops a circuit causing great power consumption in a non-refresh period so as to greatly reduce the average power consumption of a refresh period and the non-refresh period.

In order to solve the foregoing problems, a display device of the present invention which selects each line of a screen having pixels aligned in a matrix manner and provided in a display section by applying a scanning signal to a scanning signal line of a pixel of each line so as to scan the screen, and supplies a data signal from a data signal line to a pixel of a selected line so as to carry out display, is characterized by including: a driving control circuit which stops driving of driving circuits provided for driving the display section, the driving control circuit stopping driving of the driving circuits in an inaction period where all scanning signal lines become non-scanning state, the inaction period being provided between scanning periods for scanning the screen; and a clock signal generation circuit for generating a clock signal which is used for taking the data signal into the data signal line, wherein the driving control circuit stopping driving of the clock signal generation circuit in the inaction period, in addition to stopping driving of the driving circuits.

Generally, the clock signal for taking a data signal to a data signal line is a high-speed signal such as a timing clock which determines writing timing etc. Since this clock has higher speed than that of a signal (such as a horizontal synchronization signal, or a vertical synchronization signal) for determining a frame for scanning and a frame for non-scanning, the clock signal generation circuit for generating this clock signal consumes more power than that consumed in the signal generation circuit for generating the signal for determining a frame for scanning and a frame for non-scanning.

Therefore, as with the foregoing arrangement, the circuit consuming great power for generating a clock signal used for taking the data signal into the data signal line is stopped by the driving control circuit in the inaction period (the non-refresh period) provided between scanning periods (refresh periods) for scanning the screen, and therefore the power consumption in the inaction period can be greatly reduced.

Accordingly, the average power consumption of the scanning period and the inaction period can be greatly reduced, thereby realizing reduction of power consumption of the display device.

The display device of the present invention may be arranged so that the display device further includes: an output timing clock generation circuit for generating an output timing clock which is used as an output timing signal of a driving signal to the display section from the driving circuits, wherein: the clock signal generation circuit generates the clock signal based on the output timing clock generated by the output timing clock generation circuit, and the driving control circuit stops driving of the output timing clock generation circuit in the inaction period.

The output timing clock generated in the output timing clock generation circuit is used as an output timing signal of the driving signal and also for generating a clock signal in the clock signal generation circuit. Thus, the output timing clock is required to be generated in the scanning period but is not required to be generated in the non-scanning period.

Therefore, as with the foregoing arrangement, the power consumption can be reduced by stopping the output timing clock generation circuit in the inaction period.

The display device of the present invention may be arranged so that the display device further includes: a start timing clock generation circuit for generating a start timing clock which is used as a scanning start timing signal of the driving circuits, wherein: the output timing clock generation circuit generates the output timing clock based on the start timing clock generated in the start timing clock generation circuit, and the driving control circuit stops driving of the start timing clock generation circuit in the inaction period.

The start timing clock generated in the start timing clock generation circuit is used as a scanning start timing signal of the driving circuits and also for generating a output timing clock in the output timing clock generation circuit. Thus, the start timing clock is required to be generated in the scanning period but is not required to be generated in the non-scanning period.

Therefore, as with the foregoing arrangement, the power consumption can be reduced by stopping the start timing clock generation circuit in the inaction period.

The display device of the present invention may be arranged so that the clock signal generation circuit is a clock signal oscillation circuit for oscillating a clock signal.

Generally, the clock signal generation circuit is in operation in the scanning period and not in operation in the non-scanning period, and therefore operation and cessation are alternately repeated with high frequency, and this may cause some difficulties of designing of the clock signal generation circuit to be capable of generating the clock signal based on a clock having lower speed than that of the clock signal (such as the output timing clock used as an output timing signal of a driving signal to the display section from the driving circuits) for taking the data signal into the data signal line. Further, even when the designing is successfully done, there still may be instability of operation of the clock signal generation circuit.

However, as described, if the generation of the clock signal in the clock signal generation circuit is not based on an external clock, the clock signal generation circuit can be provided individually from other clock signal generation circuits. Thus, designing of the clock signal generation circuit can be simplified since the circuit only requires the structure for increasing the frequency of the clock signal, and therefore, it is possible to prevent instability of operation.

On this account, the display device can be stably driven.

Further, the average power consumption of the scanning period and the inaction period can be reduced by extending the inaction period as much as possible. As an example for realizing this arrangement, liquid crystal display elements may be used for the pixels.

In this case, the inaction period can be extended by using liquid crystal display elements for the pixels, thereby reducing the average power consumption of the scanning period and the non-scanning period.

When the pixels are made of liquid crystal display elements as with the foregoing case, and when the display device is adopted for a liquid crystal display device used in a mobile terminal such as a mobile phone, the power consumption of the display device can be greatly reduced, and therefore, if the inaction period is considered the standby period of the mobile phone for example, the power consumed in the standby state can be greatly reduced, thus extending the standby period in a mobile terminal such as a mobile phone.

Further, in order to solve the foregoing problems, the driving method of the present invention for a display device which selects each line of a screen having pixels aligned in a matrix manner by applying a scanning signal to a scanning signal line of a pixel of each line so as to scan the screen, and supplies a data signal from a data signal line to a pixel of a selected line so as to carry out display, is characterized in that an inaction period is provided between the scanning periods for scanning the screen, and driving of a clock signal generation circuit for generating a clock signal which is used for taking the data signal into the data signal line is stopped in the inaction period.

With the foregoing arrangement, by stopping the clock signal generation circuit consuming great power in the inaction period, the average power consumption of the scanning period (the refresh period) and the inaction period (the non-refresh period) can be greatly reduced.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 3(a) is a drawing showing power consumption of a display device adopting a conventional inaction driving method.

FIG. 3(b) is a drawing showing power consumption of the display device shown in FIG. 1.

FIG. 14(a) is a drawing showing driving waveform of the display device shown in FIG. 10.

FIG. 14(b) is a drawing showing driving waveform of the display device shown in FIG. 12.

DESCRIPTION OF THE EMBODIMENTS

[Embodiment 1]

The following will explain one embodiment of the present invention. This embodiment uses a display device which selects each line of a screen provided in a display section and having pixels aligned in a matrix manner by applying a scanning signal to a scanning signal line of the pixel of each line so as to scan the screen, and also supplies a data signal from a data signal line to the pixel of the selected line so as to carry out display. As to the driving method of the display device, the present embodiment uses an inaction driving method which provides an inaction period for stopping scanning of all scanning signal lines. The inaction period is provided between the respective scanning periods for scanning the screen.

Figure 1:
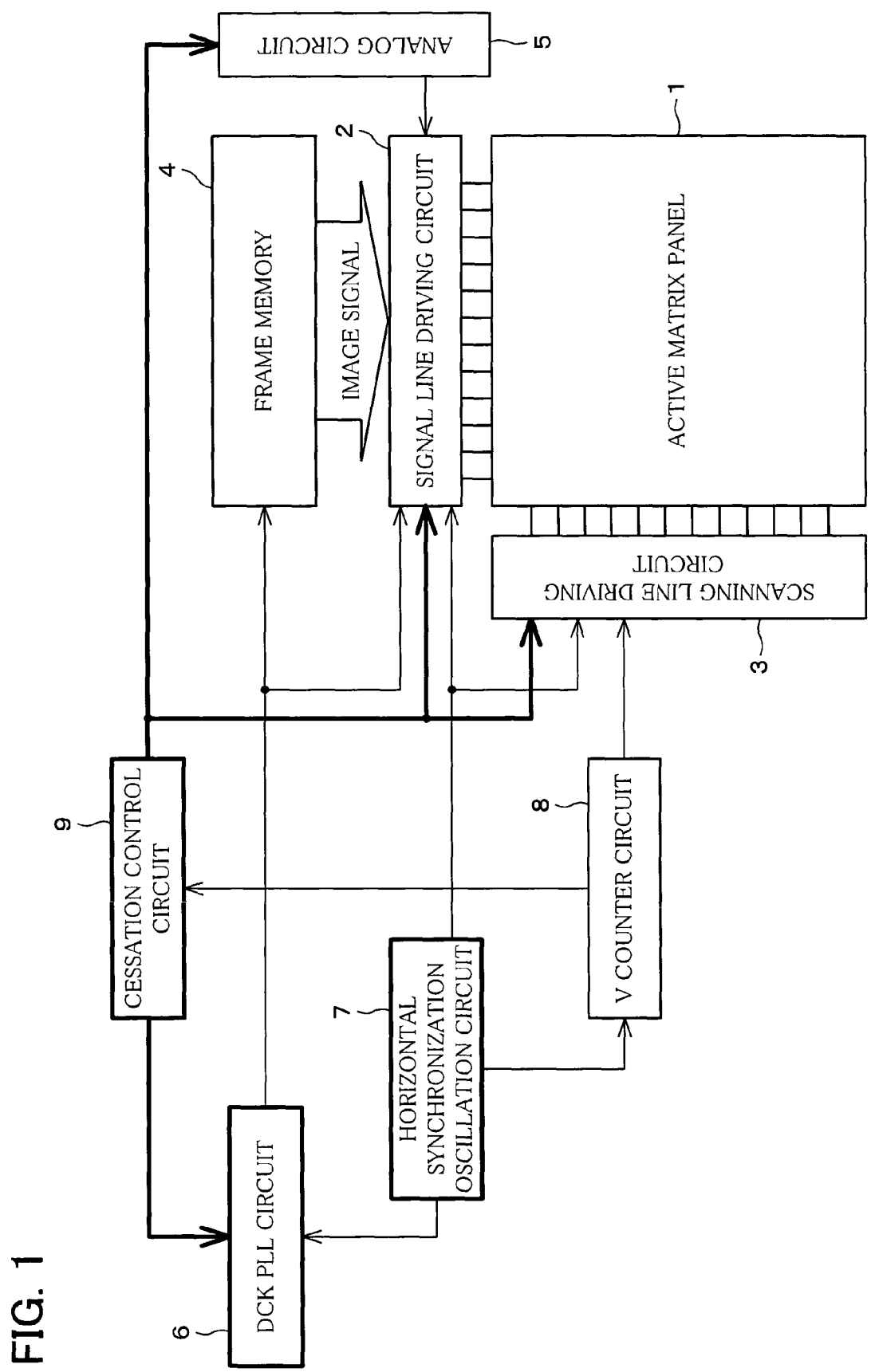
FIG. 1 is a block diagram shown in a display device according to one embodiment of the present invention.

As shown in FIG. 1, a display device according to the present embodiment includes an active matrix panel 1 having pixels which are made of liquid crystal elements and aligned in a matrix manner, a signal line driving circuit 2 for driving data signal lines (not shown) in the active matrix panel 1, a scanning line driving circuit 3 for driving scanning lines (not shown) in the active matrix panel 1, a frame memory 4 for storing a digital image signal transferred to the signal line driving circuit 2, and an analog circuit 5 for generating a signal (a level voltage) used for converting the digital image signal into an analog signal at the signal line driving circuit 2.

The signal line driving circuit 2, the scanning line driving circuit 3 and the analog circuit 5 are circuits for driving the active matrix panel 1 which is provided as a display section.

The display device further includes a DCK-PLL circuit (a clock signal generation circuit) 6 as a dot clock oscillation circuit, a horizontal synchronization oscillation circuit (an output timing clock generation circuit) 7, a V counter (a start timing clock generation circuit) 8, and an inaction control circuit (a driving control circuit) 9.

The DCK-PLL circuit 6 transfers a dot clock (a clock signal) to the signal line driving circuit 2 and the frame memory 4. Before the transfer, this dot clock is processed to be a high-speed clock in an internal PLL circuit by using a horizontal synchronization series signal supplied from the horizontal synchronization oscillation circuit 7.

The dot clock transferred to the frame memory 4 is used as a timing clock for transferring the digital image signal stored in the frame memory 4 to the signal line driving circuit 2 on a frame by frame basis. The dot clock transferred to the signal line driving circuit 2 is used as a sampling clock for taking the image signal transferred from the frame memory 4 into the data signal line.

The horizontal synchronization oscillation circuit 7 oscillates a signal by itself so as to generate a horizontal synchronization series signal, and supplies the generated horizontal synchronization series signal (an output timing clock) to the signal line driving circuit 2 and the scanning line driving circuit 3, as well as the DCK-PLL circuit 6.

The horizontal synchronization series signal generated in the horizontal synchronization oscillation circuit 7 is used in the signal line driving circuit 2 as an output timing signal of the image signal for determining output timing to the active matrix panel 1, and is used in the scanning line driving circuit 3 as an output timing signal of the scanning signal for determining output timing to the active matrix panel 1.

Further, horizontal synchronization series signal generated in the horizontal synchronization oscillation circuit 7 is also supplied to the V counter 8. The V counter 8 generates a vertical synchronization series signal (a start timing clock) from this horizontal synchronization series signal and supplies the generated signal to the scanning line driving circuit 3 so as to be used as a timing signal which controls scanning start timing of the scanning line. Note that, the vertical synchronization series signal generated in the V counter 8 is also supplied to the inaction control circuit 9.

The inaction control circuit 9 is a driving control circuit for controlling stopping of the driving of the driving circuits including the signal line driving circuit 2, the scanning line driving circuit 3, the analog circuit 5; and also controlling stopping of the DCK-PLL circuit 6 which generates a dot clock for determining driving timing of these circuits.

Here, the inaction control circuit 9 generates a driving control signal, which becomes high level in the scanning period (a refresh period) and becomes low level in the non-scanning period (a non-refresh period), from the vertical synchronization series signal so as to carry out control of driving/stopping of the driving circuits including the signal line driving circuit 2, the scanning line driving circuit 3, and the analog circuit 5, and the DCK-PLL circuit 6.

More specifically, the driving circuits including the signal line driving circuit 2, the scanning line driving circuit 3, and the analog circuit 5, and the DCK-PLL circuit 6 are controlled so that they are driven when the driving control signal is high level, and are stopped when the driving control signal is low level.

Figure 2:
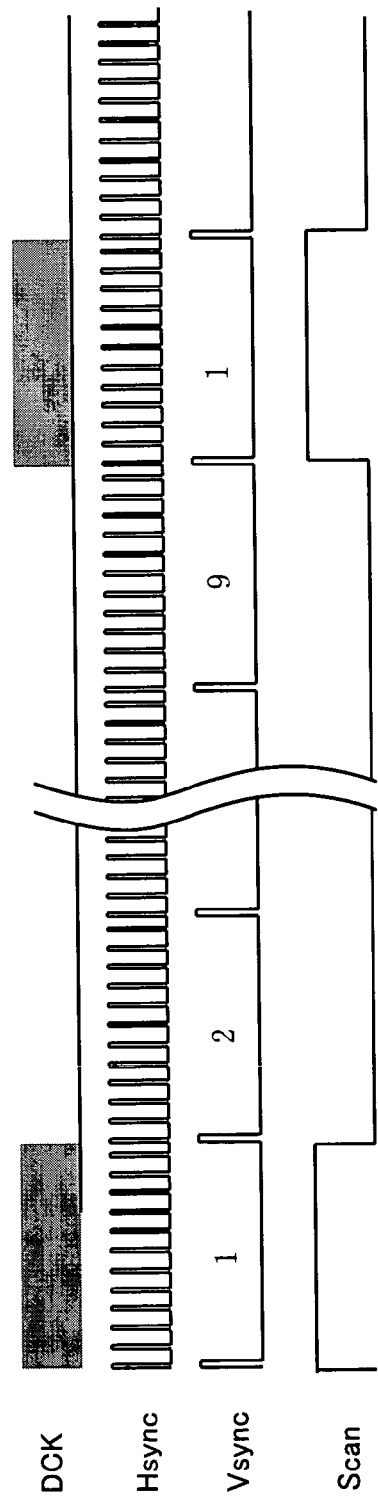
FIG. 2 is a drawing showing waveforms of a dot clock (DCK), a horizontal synchronization signal (Hsync), a vertical synchronization signal (Vsync) and a driving control signal (Scan) of the display device shown in FIG. 1.

Therefore, in the display device having the foregoing arrangement, the DCK-PLL circuit 6 generates a dot clock DCK only when the driving control signal Scan generated in the inaction control circuit 9 is high level, as shown in FIG. 2. FIG. 2 shows respective waveforms of a dot clock DCK (since it is a high speed signal, the waves are continuous in the figure) generated in the DCK-PLL circuit 6, a horizontal synchronization signal Hsync obtained by the horizontal synchronization series signal which is supplied to the signal line driving circuit 2, and a vertical synchronization signal Vsync obtained by the vertical synchronization series signal which is supplied to the scanning line driving circuit 3, and a driving control signal generated in the inaction control circuit 9.

As shown in FIG. 2, since the DCK-PLL circuit 6 driven in high-speed and consuming great power is stopped in the non-refresh period (the non-scanning period), the average power consumption of the scanning period and the non-scanning period can be greatly reduced.

Next, with reference to FIGS. 3(*a*) and 3(*b*), the following will explain the difference between power consumption of the display device having the foregoing arrangement, and power consumption of a display device (a display device shown in FIG. 12) driven by a conventional inaction driving method. FIG. 3(*a*) is a drawing showing power consumption of a display device adopting a conventional inaction driving method. FIG. 3(*b*) is a drawing showing power consumption of the display device having the foregoing arrangement.

Figure 16:
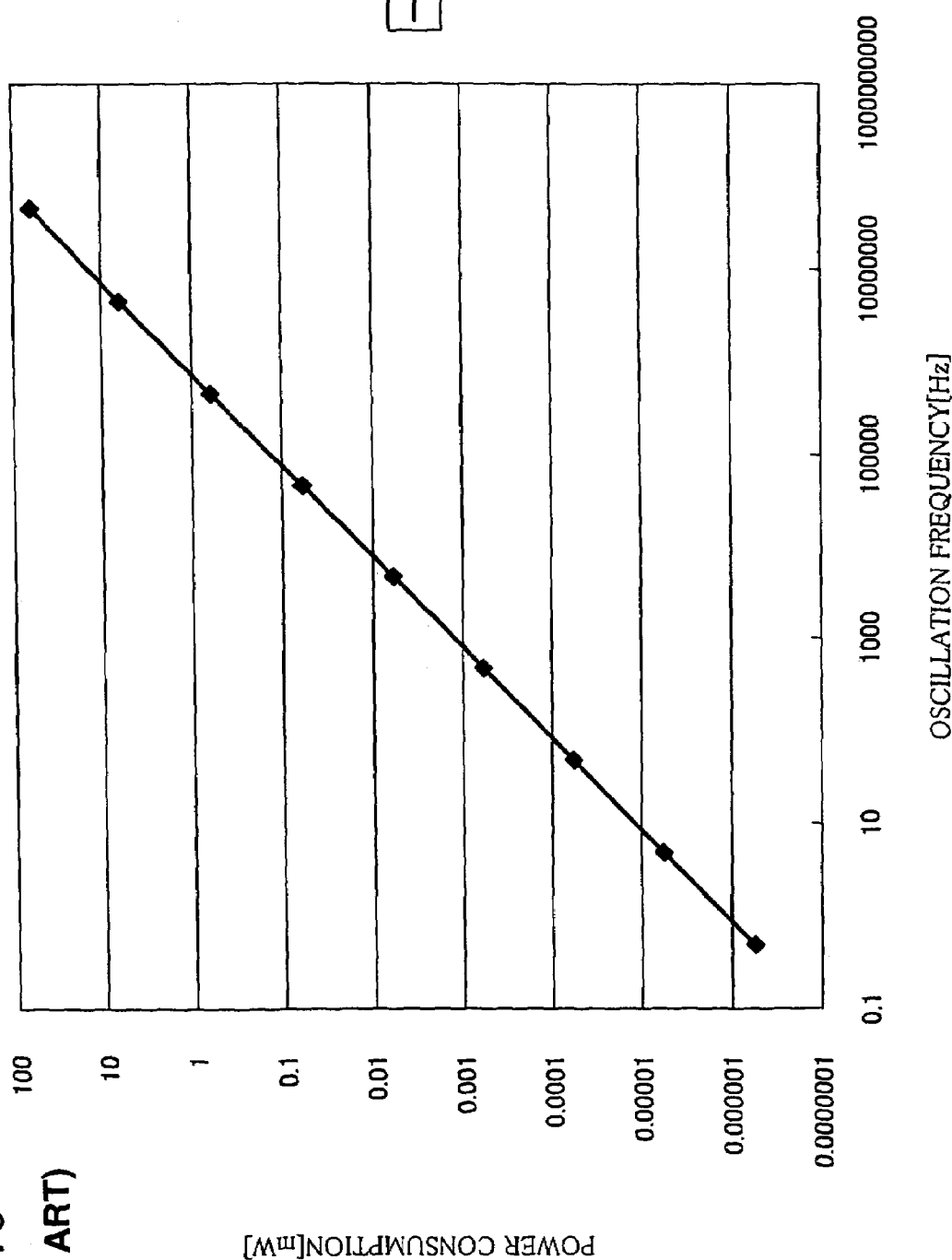
FIG. 16 is a graph showing the relation between oscillation frequency and power consumption.

Here, it is assumed that the non-scanning period provided between the respective scanning periods has a period of nine times of that of the scanning period, and power consumption in each scanning period (refresh period) is 10 mW. Further, it is also assumed that oscillation frequencies of the DCK-PLL circuit 6 and the DCK oscillation circuit 106 are both 500 Hz and thus the power consumption is found as around 2 mW according to FIG. 16.

Figure 12:
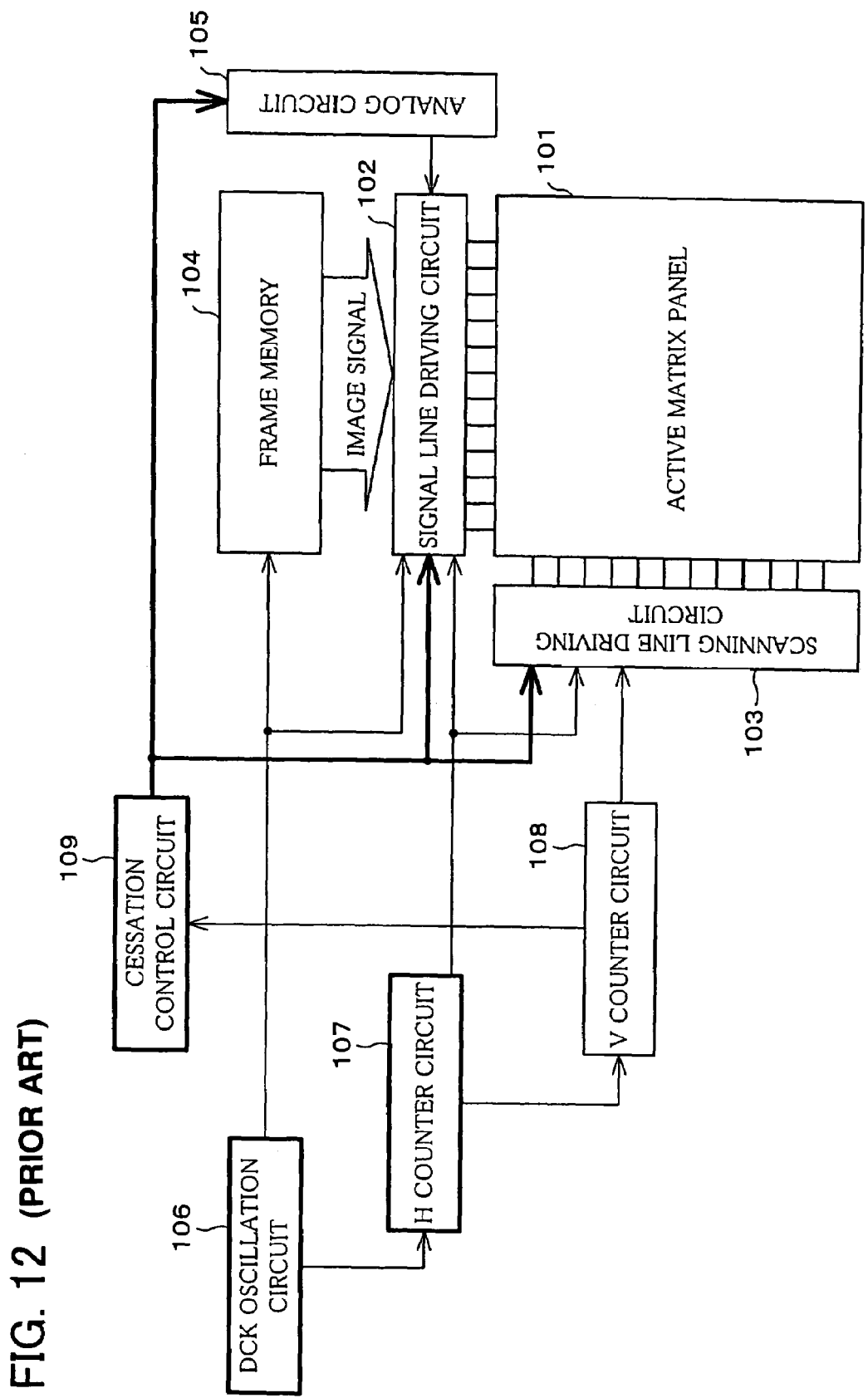
FIG. 12 is a block diagram of another general display device.
Figure 13:
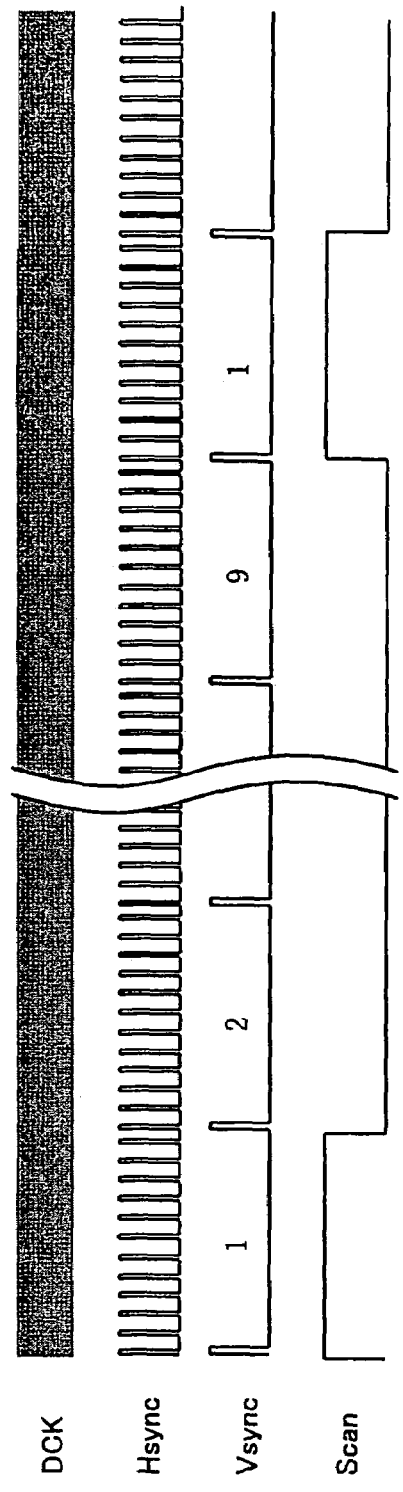
FIG. 13 is a drawing showing waveforms of a dot clock (DCK), a horizontal synchronization signal (Hsync), a vertical synchronization signal (Vsync) and a driving control signal (Scan) of the display device shown in FIG. 12.
Figure 15:
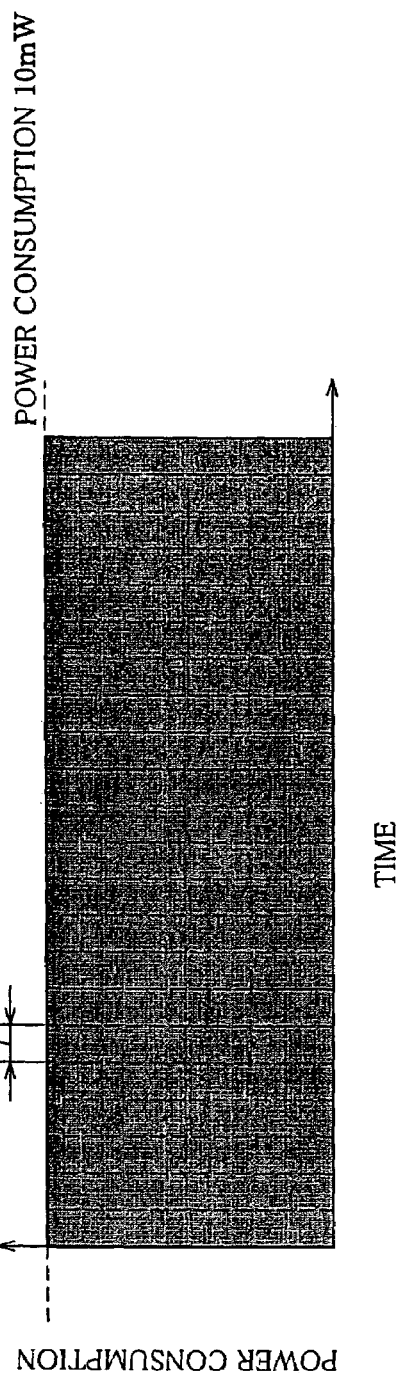
FIG. 15(a) is a drawing showing power consumption of a display device shown in FIG. 10.
FIG. 15(b) is a drawing showing power consumption of a display device shown in FIG. 12.
Figure 15:
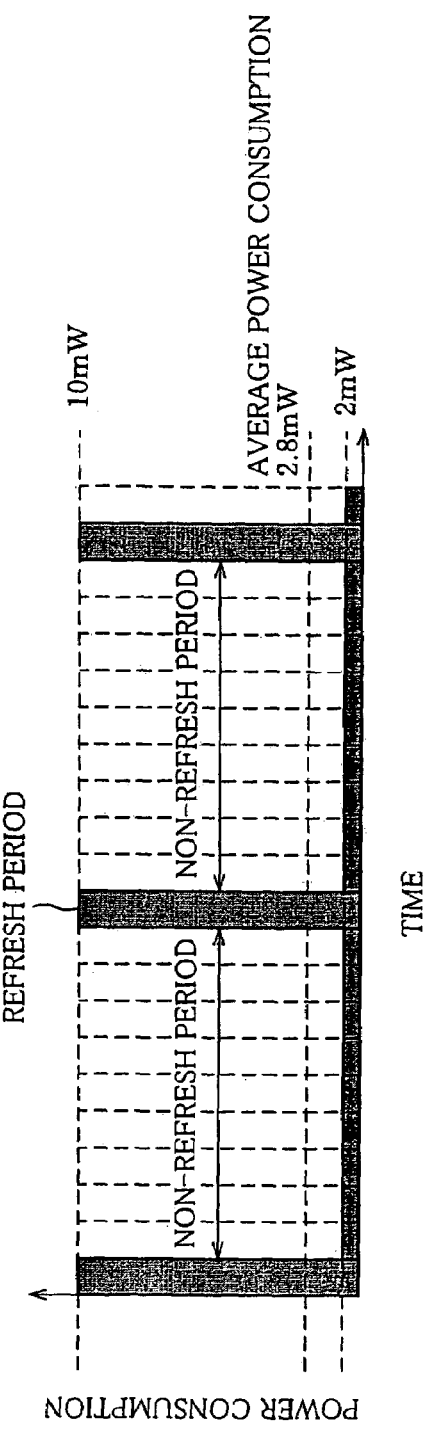

In the display device driven by a conventional inaction driving method, the DCK oscillation circuit 106 needs to operate even in the non-scanning period (the non-refresh period) so as to supply a dot clock to the H counter 107 and the V counter 108, as shown in FIG. 12. Therefore, as shown in FIG. 3(*a*), the average power consumption in the non-refresh period becomes close to 2 mW, and the average power consumption of the refresh period and the non-refresh period is found as 2.8 mW by (10 mW×1+2 mW×9)/(1+9).

In this case, even with a long non-refresh period, the average power consumption only becomes close to 2 mW, and cannot be reduced to be lower than 2 mW.

In the display device according to the present embodiment on the other hand, as shown in FIG. 1, the DCK-PLL circuit 6 supplies a dot clock only to the frame memory 4 and the signal line driving circuit 2, i.e., the dot clock is not supplied to a circuit (a horizontal synchronization oscillation circuit 7, V counter 8) for generating a horizontal synchronization series signal and a vertical synchronization series signal.

Accordingly, in the display device shown in FIG. 1, the average power consumption of the scanning period and the non-scanning period can be more greatly reduced compared to the conventional display device since the dot clock oscillation by the DCK-PLL circuit 6 consuming great power is stopped in the non-refresh period.

When the DCK-PLL circuit 6 is stopped in the non-refresh period, power consumption for driving other circuits etc. becomes approximately 0.5 mW. In this case, the average power consumption of the scanning period and the non-scanning period is found as follows.

(10 mW×1+0.5 mW×9)/(1+9)≈1.5 mW

In this case, by increasing the ratio of the non-refresh period, it becomes possible to bring the average power consumption of the scanning period and the non-scanning period to be close to 0.5 mW as much as possible.

It follows from what has been said that, when the display device of FIG. 1 is adopted in a mobile phone for example, a period of standby state can be extended if the power consumption in the non-refresh period is reduced. More specifically, if the non-refresh period is considered the standby period of a mobile phone, the power consumed in the standby state can be reduced, thus extending the standby period. There has been a demand for the power consumption in the standby state of a mobile phone to be not more than 0.5 mW, for example. The present invention can meet this demand, and besides, as described, the average power consumption of the scanning period and the non-scanning period can be almost at or less than 0.5 mW by increasing the ratio of the non-refresh period, and therefore the average power consumption of the power consumption at the standby state and the power consumption at the speaking time can be greatly reduced in a mobile phone. As a result, the number of buttery charging of a mobile phone can be reduced.

In case of a display device having a high-speed circuit (a circuit consuming great power) for oscillating a dot clock, and a low-speed circuit (a circuit consuming small power) for oscillating a horizontal synchronization series signal and a vertical synchronization series signal, as with the one of the present embodiment, by stopping the high-speed circuit consuming great power in the non-scanning period (non-refresh period) where a dot clock is not necessary, the average power consumption of the scanning period and the non-scanning period can be reduced. Accordingly, the display device of the present invention is not limited to the display device shown in FIG. 1, and display devices having arrangements shown in the following embodiments may also be adopted.

[Embodiment 2]

The following will explain another embodiment of the present invention. Note that, as with Embodiment 1, the present embodiment also uses an active matrix display device adopting the inaction driving method. Therefore, for ease of explanation, materials having the equivalent functions as those shown in the drawings pertaining to Embodiment 1 above will be given the same reference symbols, and explanation thereof will be omitted here.

Figure 4:
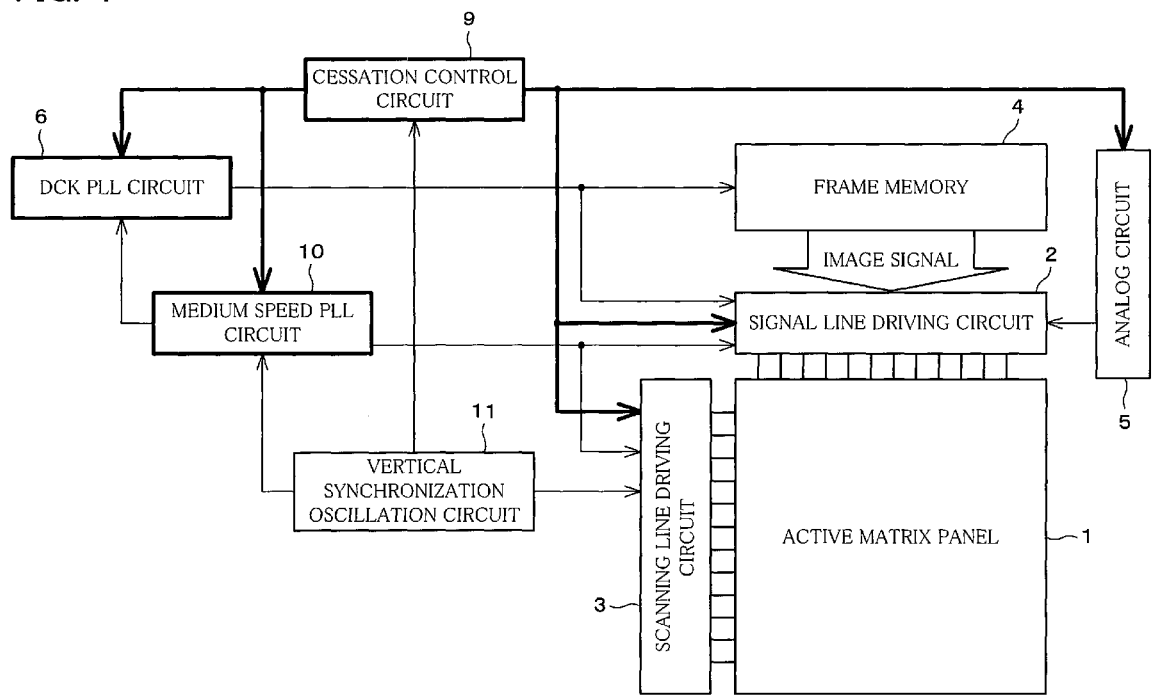
FIG. 4 is a block diagram of a display device according to another embodiment of the present invention.

As shown in FIG. 4, the display device according to the present embodiment includes a medium-speed PLL circuit (an output timing clock generation circuit) 10 and a vertical synchronization oscillation circuit (a start timing clock generation circuit) 11, which are provided respectively instead of the horizontal synchronization oscillation circuit 7 and the V counter 8 of the display device of Embodiment 1 which is shown in FIG. 1.

The vertical synchronization oscillation circuit 11 oscillates a signal by itself so as to generate a vertical synchronization series signal (a start timing clock), and supplies the generated vertical synchronization series signal to the scanning line driving circuit 3, the inaction control circuit 9, and the medium-speed PLL circuit 10. The scanning line driving circuit 3 and the inaction control circuit 9 have the same arrangements as those of Embodiment 1, and therefore minute explanations of those are omitted here.

The medium-speed PLL circuit 10 is a PLL circuit which is lower in speed than the PLL circuit in the DCK-PLL circuit 6. The medium-speed PLL circuit 10 generates a horizontal synchronization series signal (an output timing clock) by using the vertical synchronization series signal supplied from the vertical synchronization oscillation circuit 11. The horizontal synchronization series signal is transferred to the signal line driving circuit 2 and the DCK-PLL circuit 6.

The horizontal synchronization series signal is used in the signal line driving circuit 2 as a horizontal synchronization signal Hsync, and also is converted into a dot clock in the DCK-PLL circuit 6 by being processed to be a high-speed clock in an internal PLL circuit.

Here, the display device shown in FIG. 4 is arranged so that the inaction control circuit 9 also controls stopping of the driving of the medium-speed PLL circuit 10, as well as those driving circuits including the signal line driving circuit 2, the scanning line driving circuit 3, the analog circuit 5, and the DCK-PLL circuit 6.

The inaction control circuit 9 generates a driving control signal Scan based on the vertical synchronization series signal supplied from the vertical synchronization oscillation circuit 11. The driving circuits, the DCK-PLL circuit 6 and the medium-speed PLL circuit 10 are controlled so that they are driven when the driving control signal Scan is high level, and are stopped when the driving control signal Scan is low level.

Figure 5:
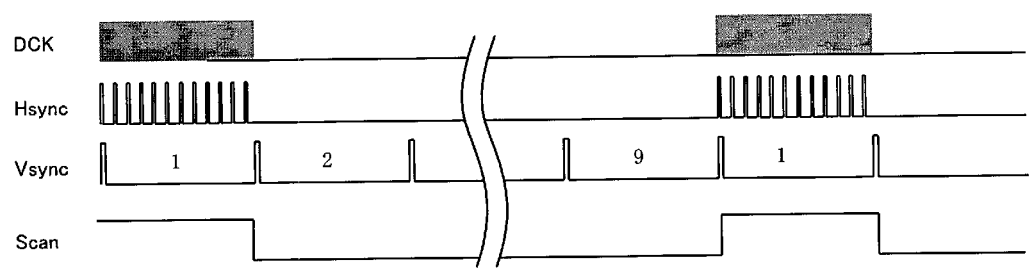
FIG. 5 is a drawing showing waveforms of a dot clock (DCK), a horizontal synchronization signal (Hsync), a vertical synchronization signal (Vsync) and a driving control signal (Scan) of the display device shown in FIG. 4.

Therefore, in the display device having the foregoing arrangement, the dot clock DCK and the horizontal synchronization signal Hsync are oscillated when the driving control signal Scan is high level, and the dot clock DCK and the horizontal synchronization signal Hsync are not oscillated when the driving control signal Scan is low level, as shown in FIG. 5, namely, the DCK-PLL circuit 6 and the medium-speed PLL circuit 10 are stopped.

On this account, when the driving control signal Scan is low level, i.e., in the non-scanning period, the medium-speed PLL circuit 10 for oscillating the horizontal synchronization series signal may also be stopped as well as the driving circuits and the DCK-PLL circuit 6, thereby further reducing the power consumption in the non-refresh period to be even less than that of Embodiment 1.

[Embodiment 3]

The following will explain still another embodiment of the present invention. Note that, as with Embodiment 2, the present embodiment also uses an active matrix display device adopting the inaction driving method. Therefore, for ease of explanation, materials having the equivalent functions as those shown in the drawings pertaining to Embodiment 2 above will be given the same reference symbols, and explanation thereof will be omitted here.

The display device according to the present embodiment includes an inaction cycle oscillation circuit (a driving control circuit) 12 and a low-speed PLL circuit (a start timing clock generation circuit) 13, which are provided respectively instead of the inaction control circuit 9 and the vertical synchronization oscillation circuit 11 of the display device of Embodiment 2 which is shown in FIG. 4.

The inaction cycle oscillation circuit 12 oscillates a signal by itself so as to generate a driving control signal Scan, and supplies the generated driving control signal Scan to the DCK-PLL circuit 6, the medium-speed PLL circuit 10 and the low-speed PLL circuit 13 as well as the driving circuits including the signal line driving circuit 2, the scanning line driving circuit 3, the analog circuit 5. Here, as with Embodiment 2 above, the driving circuits, the DCK-PLL circuit 6, and the medium-speed PLL circuit 10 are stopped with the supply of the driving control signal Scan.

The low-speed PLL circuit 13 is a PLL circuit which is lower in speed than the medium-speed PLL circuit 10. The low-speed PLL circuit 13 generates a vertical synchronization series signal (a start timing clock) by using the driving control signal Scan which has been supplied.

The vertical synchronization series signal thus generated in the low-speed PLL circuit 13 is supplied to the scanning line driving circuit 3 and the medium-speed PLL circuit 10. The vertical synchronization series signal is used in the scanning line driving circuit 3 as a vertical synchronization signal Vsync and also is used in the medium-speed PLL circuit 10 for generating a horizontal synchronization series signal.

Figure 6:
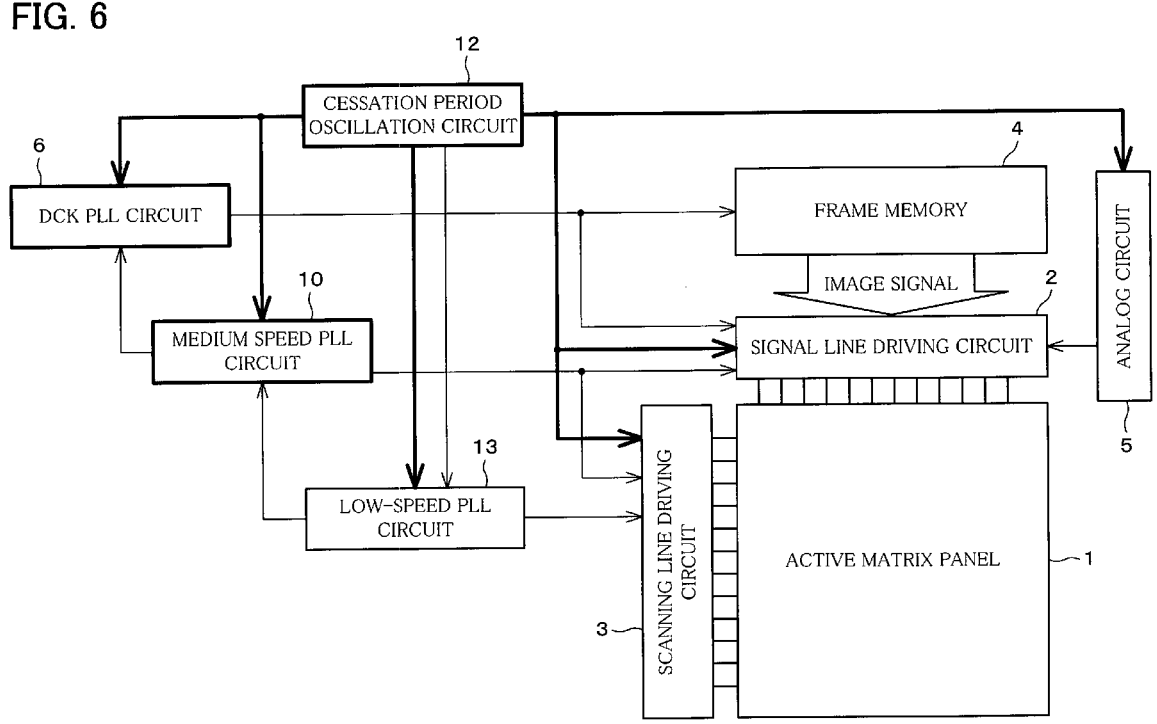
FIG. 6 is a block diagram of a display device according to still another embodiment of the present invention.

Here, the display device shown in FIG. 6 is arranged so that the inaction cycle oscillation circuit 12 also controls stopping of the driving of the low-speed PLL circuit 13 as well as those driving circuits including the signal line driving circuit 2, the scanning line driving circuit 3, the analog circuit 5, and the DCK-PLL circuit 6, and the medium-speed PLL circuit 10.

The driving circuits, the DCK-PLL circuit 6, the medium-speed PLL circuit 10, and the low-speed PLL circuit 13 are controlled so that they are driven when the driving control signal Scan oscillated in the inaction cycle oscillation circuit 12 is high level, and are stopped when the driving control signal Scan is low level.

Figure 7:
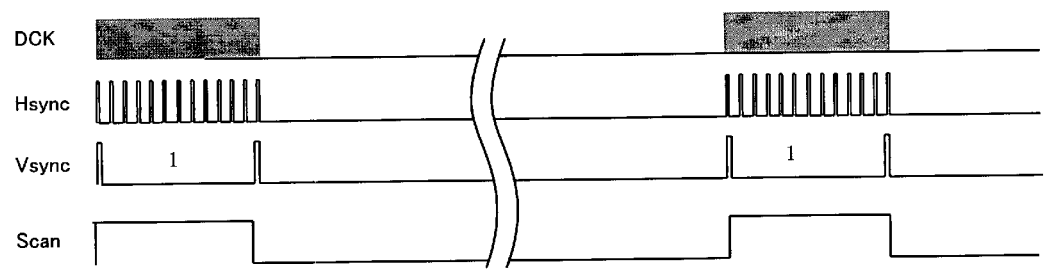
FIG. 7 is a drawing showing waveforms of a dot clock (DCK), a horizontal synchronization signal (Hsync), a vertical synchronization signal (Vsync) and a driving control signal (Scan) of the display device shown in FIG. 6.

Therefore, in the display device having the foregoing arrangement, the dot clock DCK, the horizontal synchronization signal Hsync and the vertical synchronization signal Vsync are oscillated when the driving control signal Scan is high level, and the dot clock DCK, the horizontal synchronization signal Hsync and the vertical synchronization signal Vsync are not oscillated when the driving control signal Scan is low level, as shown in FIG. 7; namely, the DCK-PLL circuit 6 and the medium-speed PLL circuit 10 and the inaction cycle oscillation circuit 12 are stopped.

On this account, when the driving control signal Scan is low level, i.e., in the non-scanning period, the low-speed PLL circuit 13 for oscillating the vertical synchronization series signal may also be stopped as well as the driving circuits, the DCK-PLL circuit 6 and the medium-speed PLL circuit 10, thereby further reducing the power consumption in the non-refresh period to be even less than that of Embodiment 2.

FIG. 7 is a drawing showing waveforms of a dot clock (DCK), a horizontal synchronization signal (Hsync), a vertical synchronization signal (Vsync) and a driving control signal (Scan) of the display device shown in FIG. 6.

All of the described embodiments above are arranged so that a low-speed clock is converted into a high-speed dot clock in the PLL circuit provided inside of the DCK-PLL circuit. In this arrangement, operation and cessation are alternately repeated with high frequency for some types of device, and this may cause some difficulties of designing of the PLL circuit. Further, even when the designing is successfully done, there still may be instability of operation. Thus, the following Embodiment 4 will explain a display device for solving these problems.

[Embodiment 4]

The following will explain yet another embodiment of the present invention. Note that, as with Embodiment 1, the present embodiment also uses an active matrix display device adopting the inaction driving method. Therefore, for ease of explanation, materials having the equivalent functions as those shown in the drawings pertaining to Embodiment 1 above will be given the same reference symbols, and explanation thereof will be omitted here.

Figure 8:
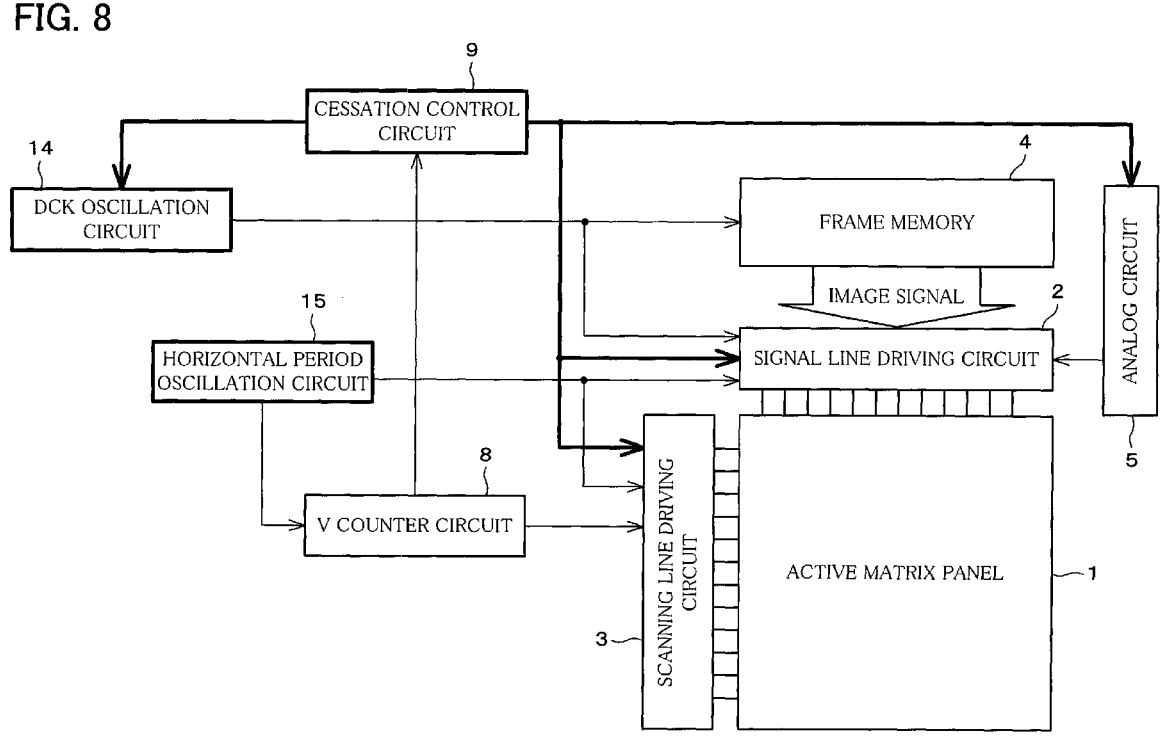
FIG. 8 is a block diagram of a display device according to yet another embodiment of the present invention.

The display device according to the present embodiment includes a DCK oscillation circuit (a clock signal generation circuit) 14 and a horizontal period oscillation circuit (an output timing clock generation circuit) 15, which are provided respectively instead of the DCK-PLL circuit 6 and the horizontal synchronization oscillation circuit 7 of the display device of Embodiment 1 which is shown in FIG. 8.

The DCK oscillation circuit 14 has the same arrangement as that of the DCK-PLL circuit 6 shown in FIG. 1 except for omission of the internal PLL circuit. The DCK oscillation circuit 14 oscillates a signal by itself so as to generate a dot clock. Therefore, the DCK oscillation circuit 14, as a high-speed driving circuit, is not supplied with an external signal and therefore is provided as an individual circuit.

Further, in contrast to the horizontal synchronization oscillation circuit 7 shown in FIG. 1, the horizontal period oscillation circuit 15 oscillates a signal by itself so as to generate a horizontal synchronization series signal (an output timing clock), and supplies the generated horizontal synchronization series signal to the V counter 8 as well as the signal line driving circuit 2 and the scanning line driving circuit 3.

The V counter 8 generates a vertical synchronization series signal by using the supplied horizontal synchronization series signal, and supplies the generated signal to the scanning line driving circuit 3 and the inaction control circuit 9.

The vertical synchronization series signal is used in the scanning line driving circuit 3 for controlling scanning start timing, and is used in the inaction control circuit 9 for generating a driving control signal Scan.

Here, the inaction control circuit 9 generates a driving control signal, which becomes high level in the scanning period (a refresh period) and becomes low level in the non-scanning period (a non-refresh period), from the vertical synchronization series signal so as to carry out control of driving/stopping of the driving circuits including the signal line driving circuit 2, the scanning line driving circuit 3, and the analog circuit 5, and the DCK oscillation circuit 14.

More specifically, the driving circuits including the signal line driving circuit 2, the scanning line driving circuit 3, and the analog circuit 5, and the DCK oscillation circuit 14 are controlled so that they are driven when the driving control signal is high level, and are stopped when the driving control signal is low level.

Figure 9:
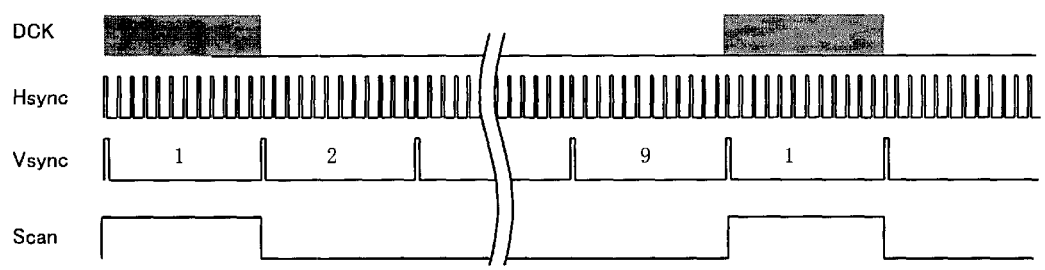
FIG. 9 is a drawing showing waveforms of a dot clock (DCK), a horizontal synchronization signal (Hsync), a vertical synchronization signal (Vsync) and a driving control signal (Scan) of the display device shown in FIG. 8.
Figure 10:
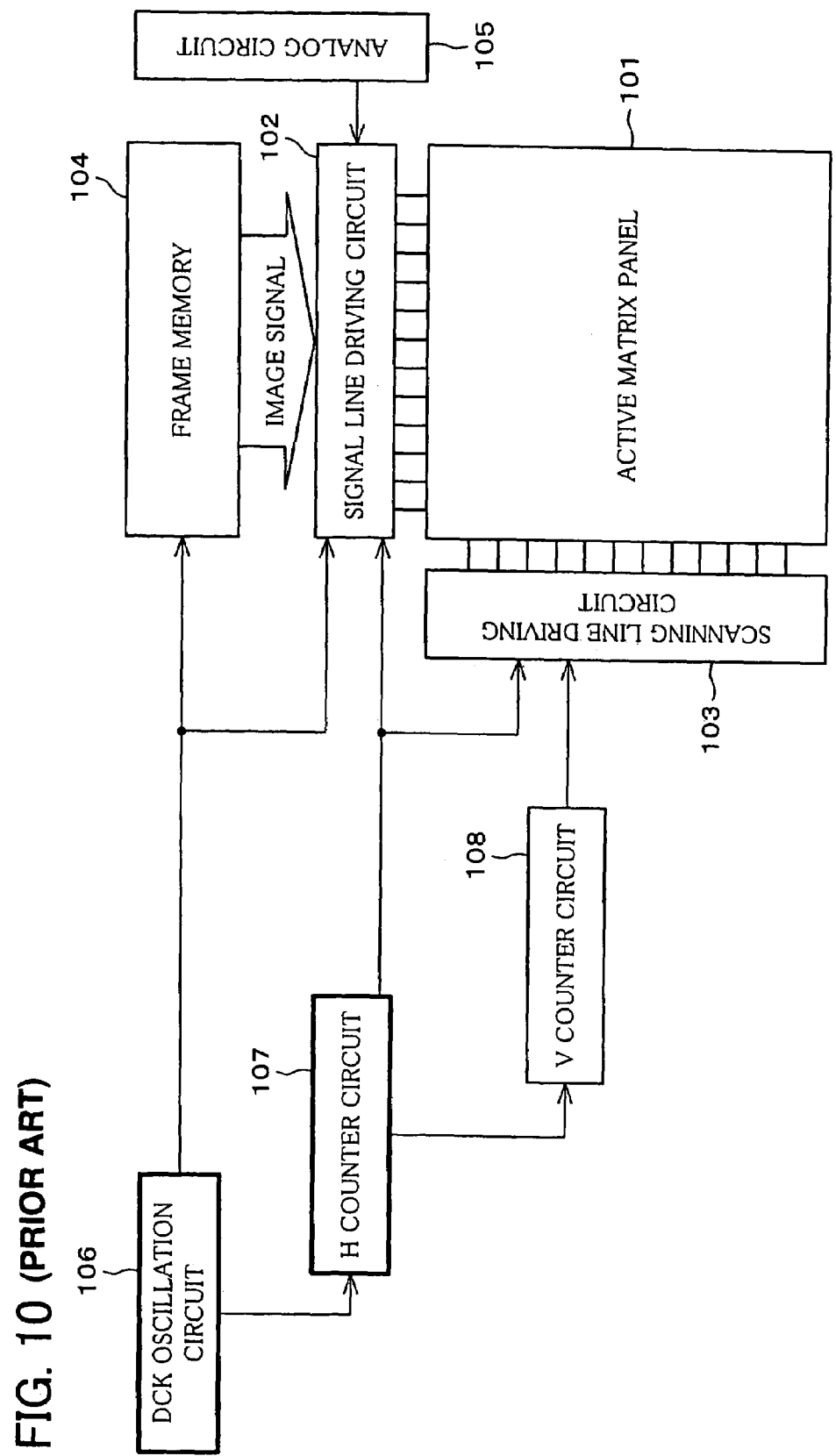
FIG. 10 is a block diagram of a general display device.
Figure 11:
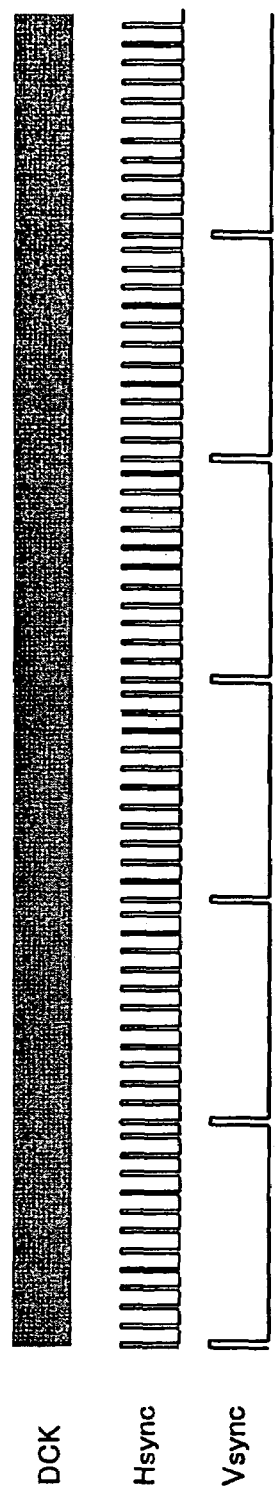
FIG. 11 is a drawing showing waveforms of a dot clock (DCK), a horizontal synchronization signal (Hsync), a vertical synchronization signal (Vsync) and a driving control signal (Scan) of the display device shown in FIG. 10.

Therefore, in the display device having the foregoing arrangement, the DCK oscillation circuit 14 generates a dot clock DCK only when the driving control signal Scan generated in the inaction control circuit 9 is high level, as shown in FIG. 9.

As shown in FIG. 9, since the DCK oscillation circuit 14 consuming great power can be stopped in the non-refresh period (the non-scanning period), the average power consumption of the scanning period and the non-scanning period can be greatly reduced.

Beside, the DCK oscillation circuit 14 generating a dot clock by oscillating a signal by itself, and therefore not requiring a PLL circuit for converting a low-speed clock into a high-speed clock. On this account, the designing of the DCK oscillation circuit 14 can be simplified, and also it becomes possible to prevent instability due to speed conversion of the clock, thereby providing a stable DCK oscillation circuit 14 with a simple structure.

Accordingly, the display device shown in FIG. 8 is capable of realizing both reduction of power consumption and stability of the device at the same time.

There are no specific limitations for the active matrix panel 1 in the described Embodiments 1 through 4; however, the present invention allows use of an amorphous silicon, a polysilicon, a CGS, or the like for the active matrix panel.

An active matrix panel using an amorphous silicon carries out line-sequential driving in which an image signal is written to the panel for each horizontal line; in contrast, an active matrix panel using a polysilicon or a CGS may perform point-sequential driving in which an image signal is written for each dot.

In this case, not only the dot clock but also the timing clock used for the point-sequential driving is a type of high-speed clock, and therefore a circuit for generating the timing clock for the point-sequential driving is also regarded a high-speed circuit as well as the DCK-PLL circuit 6 etc. Accordingly, it is required to also stop this circuit for generating the timing clock for the point-sequential driving in the inaction period.

Further, there are no specific limitations for the pixel scanning method of the active matrix panel 1; however, the present invention allows use of such as line-sequential scanning driving, point-sequential scanning driving or the like.

Further, the respective embodiments above use liquid crystal display elements as the pixels constituting the active matrix panel 1; however, the present invention is not limited to this type of elements, and any hold-type display elements capable of holding voltage application may be used in addition to the liquid crystal display elements.

Further, since the present invention provides a technology effective for any general active matrix display devices, the display device of the present invention can be adopted for not only a liquid crystal active matrix display device but also other active matrix display devices such as an organic EL.

As described, the display device of the present invention which selects each line of a screen having pixels aligned in a matrix manner and provided in a display section by applying a scanning signal to a scanning signal line of a pixel of each line so as to scan the screen, and supplies a data signal from a data signal line to a pixel of a selected line so as to carry out display, is arranged so that: the display device includes a driving control circuit which stops driving of driving circuits provided for driving the display section, the driving control circuit stopping driving of the driving circuits in an inaction period where all scanning signal lines become non-scanning state, the inaction period being provided between scanning periods for scanning the screen; and a clock signal generation circuit for generating a clock signal which is used for taking the data signal into the data signal line, wherein the driving control circuit stopping driving of the clock signal generation circuit in the inaction period, in addition to stopping driving of the driving circuits.

Therefore, the circuit for generating a clock signal used for taking the data signal into the data signal line is stopped by the driving control circuit in the inaction period (the non-refresh period) provided between scanning periods (refresh periods) for scanning the screen, and therefore the power consumption in the inaction period can be greatly reduced.

Accordingly, the average power consumption of the scanning period and the inaction period can be greatly reduced, thereby realizing reduction of power consumption of the display device.

The display device of the present invention may be arranged so that the display device further includes: an output timing clock generation circuit for generating an output timing clock which is used as an output timing signal of a driving signal to the display section from the driving circuits, wherein: the clock signal generation circuit generates the clock signal based on the output timing clock generated by the output timing clock generation circuit, and the driving control circuit stops driving of the output timing clock generation circuit in the inaction period.

The output timing clock generated in the output timing clock generation circuit is used as an output timing signal of the driving signal and also for generating a clock signal in the clock signal generation circuit. Thus, the output timing clock is required to be generated in the scanning period but is not required to be generated in the non-scanning period.

Therefore, as with the foregoing arrangement, the power consumption can be reduced by stopping the output timing clock generation circuit in the inaction period.

The display device of the present invention may be arranged so that the display device further includes: a start timing clock generation circuit for generating a start timing clock which is used as a scanning start timing signal of the driving circuits, wherein: the output timing clock generation circuit generates the output timing clock based on the start timing clock generated in the start timing clock generation circuit, and the driving control circuit stops driving of the start timing clock generation circuit in the inaction period.

The start timing clock generated in the start timing clock generation circuit is used as a scanning start timing signal of the driving circuits and also for generating a output timing clock in the output timing clock generation circuit. Thus, the start timing clock is required to be generated in the scanning period but is not required to be generated in the non-scanning period.

Therefore, as with the foregoing arrangement, the power consumption can be reduced by stopping the start timing clock generation circuit in the inaction period.

The display device of the present invention may be arranged so that the clock signal generation circuit is a clock signal oscillation circuit for oscillating a clock signal.

Therefore, since the generation of the clock signal in the clock signal generation circuit is not based on an external clock, the clock signal generation circuit can be provided individually from other clock signal generation circuits. When the clock signal generation circuit is individually provided as with the foregoing case, designing of the clock signal generation circuit can be simplified since the circuit only requires the structure for increasing the frequency of the clock signal, and therefore, it is possible to prevent instability of operation. On this account, the display device can be stably driven.

Further, the average power consumption of the scanning period and the inaction period can be reduced by extending the inaction period as much as possible. As an example for realizing this arrangement, liquid crystal display elements may be used for the pixels.

In this case, the inaction period can be extended by using liquid crystal display elements for the pixels, thereby reducing the average power consumption of the scanning period and the non-scanning period.

When the pixels are made of liquid crystal display elements as with the foregoing case, and when the display device is adopted for a liquid crystal display device used in a mobile terminal such as a mobile phone, the power consumption of the display device can be greatly reduced, and therefore, if the inaction period is considered the standby period of the mobile phone for example, the power consumed in the standby state can be greatly reduced, thus extending the standby period in a mobile terminal such as a mobile phone.

Further, in order to solve the foregoing problems, the driving method of the present invention for a display device which selects each line of a screen having pixels aligned in a matrix manner by applying a scanning signal to a scanning signal line of a pixel of each line so as to scan the screen, and supplies a data signal from a data signal line to a pixel of a selected line so as to carry out display, is characterized in that an inaction period is provided between the scanning periods for scanning the screen, and driving of a clock signal generation circuit for generating a clock signal which is used for taking the data signal into the data signal line is stopped in the inaction period.

With the foregoing arrangement, by stopping the clock signal generation circuit consuming great power in the inaction period, the average power consumption of the scanning period and the inaction period can be greatly reduced.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A display device which selects each line of a screen having pixels aligned in a matrix manner and provided in a display section by applying a scanning signal to a scanning signal line of a pixel of each line so as to scan the screen, and supplies a data signal from a data signal line to a pixel of a selected line so as to carry out display, comprising:
    a driving control circuit which (a) generates, as a driving control signal, a control clock signal based on at least a base clock signal, the control clock signal defining an inaction period where all scanning signal lines become non-scanning state, the inaction period being provided between scanning periods for scanning the screen, and which (b) stops driving of driving circuits provided for driving the display section, the driving control circuit stopping driving of the driving circuits in the inaction period; and
    a clock signal generation circuit for generating a clock signal which is used for taking the data signal into the data signal line, the clock signal being faster than the control clock signal and the base clock signal; wherein
    the driving control circuit stops driving of the clock signal generation circuit in the inaction period, in addition to stopping driving of the driving circuits, and maintains driving for obtaining at least one of the control clock signal and the base clock signal, and
    the base clock signal, the clock signal and the control clock signal have different speeds.

2. The display device as set forth in claim 1, wherein:
    liquid crystal display elements are used as the pixels.

3. The display device as set forth in claim 1, wherein:
    the clock signal generation circuit generates the clock signal based on the control signal generated by the driving control circuit.

4. The display device as set forth in claim 3, further comprising:
    a start timing clock generation circuit for generating a start timing clock which is used as a scanning start timing signal of the driving circuits,
    wherein:
    the start timing clock generation circuit generates the start timing clock from the control clock signal generated by the driving control circuit.

5. The display device as set forth in claim 4, further comprising:
    an output timing clock generation circuit for generating an output timing clock which is used as an output timing signal of a driving signal to the display section from the driving circuits,
    wherein:
    the clock signal generation circuit generates the clock signal from the output timing clock generated by the output timing clock generation circuit.

6. The display device as set forth in claim 5, further comprising:
    an output timing clock generation circuit for generating an output timing clock which is used as an output timing signal of a driving signal to the display section from the driving circuits; and
    a start timing clock generation circuit for generating a start timing clock which is used as a scanning start timing signal of the driving circuits,
    wherein:
    the start timing clock generation circuit generates the start timing clock from the output timing clock generated in the output timing clock generation circuit.

7. The display device as set forth in claim 6, wherein:
    the driving control circuit generates the control clock signal based on the start timing clock generated by the start timing clock generation circuit.

8. The display device of claim 1, wherein the clock signal has a fastest clock speed.

9. A display device which selects each line of a screen having pixels aligned in a matrix manner and provided in a display section by applying a scanning signal to a scanning signal line of a pixel of each line so as to scan the screen, and supplies a data signal from a data signal line to a pixel of a selected line so as to carry out display, comprising:
    a driving control circuit which (a) generates, as a driving control signal, a control clock signal that defines an inaction period where all scanning signal lines become non-scanning state, the inaction period being provided between scanning periods for scanning the screen, and which (b) stops driving of driving circuits provided for driving the display section, the driving control circuit stopping driving of the driving circuits in the inaction period;
    a clock signal generation circuit for generating a clock signal which is used for taking the data signal into the data signal line, the clock signal being faster than the control clock signal;
    the driving control circuit stopping driving of the clock signal generation circuit in the inaction period, in addition to stopping driving of the driving circuits and maintaining driving for obtaining at least one of the control clock signal and a base clock signal;

an output timing clock generation circuit for generating an output timing clock which is used as an output timing signal of a driving signal to the display section from the driving circuits, wherein:

the clock signal generation circuit generates the clock signal based on the output timing clock generated by the output timing clock generation circuit, and the driving control circuit stops driving of the output timing clock generation circuit in the inaction period, and the output timing clock, the control clock signal and the clock signal have different speeds.

10. The display device as set forth in claim 9, further comprising:

a start timing clock generation circuit for generating a start timing clock which is used as a scanning start timing signal of the driving circuits, wherein:

the output timing clock generation circuit generates the output timing clock based on the start timing clock generated in the start timing clock generation circuit.

11. The display device as set forth in claim 10, wherein:

the driving control circuit generates the control clock signal based on the start timing clock generated by the start timing clock generation circuit.

12. The display device of claim 9, wherein the clock signal has a fastest clock speed.

13. A display device which selects each line of a screen having pixels aligned in a matrix manner and provided in a display section by applying a scanning signal to a scanning signal line of a pixel of each line so as to scan the screen, and supplies a data signal from a data signal line to a pixel of a selected line so as to carry out display, comprising:

a driving control circuit which (a) generates, as a driving control signal, a control clock signal that defines an inaction period where all scanning signal lines become non- scanning state, the inaction period being provided between scanning periods for scanning the screen, and which (b) stops driving of driving circuits provided for driving the display section, the driving control circuit stopping driving of the driving circuits in the inaction period;

a clock signal generation circuit for generating a clock signal which is used for taking the data signal into the data signal line, the clock signal being faster than the control clock signal;

the driving control circuit stopping driving of the clock signal generation circuit in the inaction period, in addition to stopping driving of the driving circuits, and maintaining driving for obtaining at least one of the control clock signal and a base clock signal;

an output timing clock generation circuit for generating an output timing clock which is used as an output timing signal of a driving signal to the display section from the driving circuits; and a start timing clock generation circuit for generating a start timing clock which is used as a scanning start timing signal of the driving circuits, wherein:

the output timing clock generation circuit generates the output timing clock based on the start timing clock generated in the start timing clock generation circuit, the clock signal generation circuit generates the clock signal based on the output timing clock generated by the output timing clock generation circuit and the driving control circuit stops driving of the start timing clock generation circuit in the inaction period, based on the control clock signal, and the start timing clock, the control clock signal and the clock signal have different speeds.

14. The display device of claim 13, wherein the clock signal has a fastest clock speed.

15. A display device which selects each line of a screen having pixels aligned in a matrix manner and provided in a display section by applying a scanning signal to a scanning signal line of a pixel of each line so as to scan the screen, and supplies a data signal from a data signal line to a pixel of a selected line so as to carry out display, comprising:

a driving control circuit which (a) generates, as a driving control signal, a control clock signal based on a base clock signal, the control clock signal defining an inaction period where all scanning signal lines become non-scanning state, the inaction period being provided between scanning periods for scanning the screen, and which (b) stops driving of driving circuits provided for driving the display section, the driving control circuit stopping driving of the driving circuits in the inaction period;

a clock signal generation circuit for generating a clock signal, the clock signal being used for taking the data signal into the data signal line, the clock signal being faster than the control clock signal;

the driving control circuit stopping driving of the clock signal generation circuit in the inaction period, in addition to stopping driving of the driving circuits, and maintaining driving for obtaining at least one of the control clock signal and the base clock signal; wherein the clock signal generation circuit is a clock signal oscillation circuit for oscillating a clock signal, and the control clock signal, the clock signal and the base clock signal have different speeds.

16. The display device of claim 15, wherein the clock signal has a fastest clock speed.

17. A driving method for a display device which selects each line of a screen having pixels aligned in a matrix manner by applying a scanning signal to a scanning signal line of a pixel of each line so as to scan the screen, and supplies a data signal from a data signal line to a pixel of a selected line so as to carry out display, the driving method comprising:

generating, as a driving control signal, a control clock signal based on at least a base clock signal, the control clock signal defining an inaction period where all scanning signal lines become non-scanning state, the inaction period being provided between scanning periods for scanning the screen;

stopping driving of a clock signal generation circuit in the inaction period, while maintaining driving for obtaining at least one of the control clock signal and the base clock signal, the clock signal generation circuit being for generating a clock signal which is used for taking the data signal into the data signal line, the clock signal being faster than the control clock signal and the base clock signal; wherein the base clock signal, the control clock signal and the clock signal have different speeds.

18. The method of claim 17, wherein the clock signal has a fastest clock speed.

19. A display device which selects each line of a screen having pixels aligned in a matrix manner and provided in a display section by applying a scanning signal to a scanning signal line of a pixel of each line so as to scan the screen, and supplies a data signal from a data signal line to a pixel of a selected line so as to carry out display, comprising:

a driving control circuit which (a) generates, as a driving control signal, a control clock signal that defines an inaction period where all scanning signal lines become non- scanning state, the inaction period being provided between scanning periods for scanning the screen, and which (b) stops driving of driving circuits provided for driving the display section, the driving control circuit stopping driving of the driving circuits in the inaction period;

a clock signal generation circuit for generating a clock signal which is used for taking the data signal into the data signal line, the clock signal being faster than the control clock signal;

the driving control circuit stopping driving of the clock signal generation circuit in the inaction period, in addition to stopping driving of the driving circuits, and maintaining driving for obtaining at least one of the control clock signal and a base clock signal; and an output timing clock generation circuit for generating an output timing clock which is used as an output timing signal of a driving signal to the display section from the driving circuits, wherein:

the clock signal generation circuit generates the clock signal based on the output timing clock generated by the output timing clock generation circuit, and the control clock signal, the clock signal and the output timing clock have different speeds.

20. The display device as set forth in claim 19, further comprising:

a start timing clock generation circuit for generating a start timing clock which is used as a scanning start timing signal of the driving circuits, wherein:

the start timing clock generation circuit generates the start timing clock based on the output timing clock generated in the output timing clock generation circuit.

21. The display device as set forth in claim 20, wherein:

the driving control circuit generates the control clock signal based on the start timing clock generated by the start timing clock generation circuit.

22. The display device of claim 19, wherein the clock signal has a fastest clock speed.

* * * * *